US006687643B1

(12) United States Patent
Cason, Jr.

(10) Patent No.: US 6,687,643 B1
(45) Date of Patent: Feb. 3, 2004

(54) IN-SITU SENSOR SYSTEM AND METHOD FOR DATA ACQUISITION IN LIQUIDS

(75) Inventor: John L. Cason, Jr., Huntsville, AL (US)

(73) Assignee: Unirex, Inc., Huntsville, AL (US)

( * ) Notice: Subject to any disclaimer, the term of this patent is extended or adjusted under 35 U.S.C. 154(b) by 0 days.

(21) Appl. No.: 10/027,438

(22) Filed: Dec. 21, 2001

Related U.S. Application Data

(60) Provisional application No. 60/258,170, filed on Dec. 22, 2000.

(51) Int. Cl.$^7$ .................................................. G01L 7/00
(52) U.S. Cl. ...................... 702/137; 73/861.42; 73/438; 73/290 V; 361/283.4; 367/82; 702/55; 702/138
(58) Field of Search ................................. 73/32 A, 299, 73/302, 434, 437, 438, 439, 453, 861; 367/82; 702/45, 50, 127, 137, 138; 361/283

(56) References Cited

U.S. PATENT DOCUMENTS

| | | | |
|---|---|---|---|
| 1,457,406 A | 6/1923 | Stancliffe | |
| 2,521,477 A | 9/1950 | Pellettere | |
| 3,038,336 A | 6/1962 | Peters | |
| 3,932,038 A | 1/1976 | Schweizer et al. | |
| 4,011,746 A | 3/1977 | Weitz, Jr. et al. | |
| 4,037,967 A | 7/1977 | Schweizer et al. | |
| 4,114,423 A | 9/1978 | Wenger | |
| 4,132,110 A | 1/1979 | Muramoto | |
| 4,136,567 A | 1/1979 | Rosenblum | |
| 4,235,099 A | 11/1980 | Ishizaka | |
| 4,307,609 A | 12/1981 | Rosemblum | |
| 4,322,775 A | * 3/1982 | Delatorre | 361/283.4 |
| 4,400,978 A | 8/1983 | Guay et al. | |
| 4,425,787 A | 1/1984 | Saraf | |
| 4,553,216 A | * 11/1985 | Steven et al. | 702/55 |
| 4,630,478 A | 12/1986 | Johnson | |
| 4,674,322 A | 6/1987 | Stangeland | |
| 4,677,851 A | 7/1987 | McAuley | |
| H490 H | 7/1988 | Ebbrell | |
| 4,811,601 A | 3/1989 | Tolan | |
| 4,981,042 A | 1/1991 | Reeves | |
| 5,237,853 A | 8/1993 | Cassaday et al. | |
| 5,319,964 A | 6/1994 | Stephenson et al. | |
| 5,447,063 A | 9/1995 | Glassey | |
| 5,587,527 A | 12/1996 | Radford et al. | |
| 5,811,690 A | * 9/1998 | Hershey | 73/861.42 |
| 5,827,963 A | 10/1998 | Selegatto et al. | |
| 5,953,954 A | 9/1999 | Drain et al. | |
| 6,053,041 A | 4/2000 | Sinha | |
| 6,234,019 B1 | 5/2001 | Caldeira | |
| 6,426,917 B1 | * 7/2002 | Tabanou et al. | 367/82 |

OTHER PUBLICATIONS

"Microflow Based differential pressure sensor", Colhen et al., Pub. No. US 2002/0077759 A1, Pub. Date: Jun. 20, 2002.*

* cited by examiner

*Primary Examiner*—John Barlow
*Assistant Examiner*—John Se
(74) *Attorney, Agent, or Firm*—Lanier Ford Shaver & Payne P.C.

(57) ABSTRACT

An in-situ sensor system and method which measures the density of a liquid accurately with pressure sensors by measuring pressure in the liquid at two separate positions defined by a fixed distance. The fixed distance is known accurately to at least the nearest 0.0001 inch by measuring temperature simultaneously with pressure measurements. The temperature is used to correct for temperature-related changes in length of the material to which the pressure sensors are fixed. Because pressure sensors and temperature sensors can be relatively small, the sensor system is small, portable, and can be easily and safely inserted into or removed from tanks through a small opening. A data acquisition system acquires data with a remote telemetry system, provides the data to users through a communications network, and provides density, height, volume, and leak rate of the liquids using one or more data management systems.

26 Claims, 2 Drawing Sheets

IN-SITU SENSOR SYSTEM AND METHOD FOR DATA ACQUISITION IN LIQUIDS

This application claims the benefit of U.S. Provisional Application No. 60/258,170, filed Dec. 22, 2000, the disclosure of which is hereby incorporated by reference.

BACKGROUND OF INVENTION

1. Field of the Invention

The present invention relates generally to the field of bulk fluid container sensors and, more particularly, to an in-situ container sensor system and method for obtaining real-time temperature and pressure readings used in calculating the actual density of a liquid material in a container.

2. Technical Background

Container sensors are known in the art and typically include capacitance probes, float actuated electro-mechanical devices, hydrostatic (pressure), ultrasonic or manual sensors. These sensors usually provide only the height or level of the liquid material in a container, not the true density of that liquid material at known or various temperatures. Density determinations are in accurate because they are based upon assumptions as to the overall liquid material temperature, and stated specific gravity which may be inaccurate.

In addition to the minimum data acquisition provided by the current container sensors, it is well known that the use of these container sensors provide a safety concern as well. For example, when using a physical measurement system, an individual has to open a hatch on top of the container to use a physical measuring tool, which can not only have environmental concerns but also health and safety concerns. Sensors, such as strain, radar, or ultrasonic, to be used on the exterior of the container to measure the liquid weight or fluid height, e.g., volume of liquid remaining in the tank, appear to solve this concern, however, they only return a single measurement value. Once attached to the exterior of the container, these sensors are difficult to remove or calibrate. Moreover, in instances where two sensors may be used it is difficult to determine the separation distance between the sensors on the outside of the container, due to expansion and contraction of the assembly that holds the two sensors, a slight variation in the distance span between the two sensors could dramatically affect the accuracy of the temperature readings, and thus, the density calculations.

Further, real-time, in-situ density information cannot be provided when using these sensors. For instance, when using an acoustic system, pressure sensors are inserted in the container to measure the volumetric change as a function of the distance to the fluid surface. Thus, use of the current sensors provide no mechanism within which to determine two measurements that indicate actual fluid material inside the container, or the actual steady-state temperature of the material inside the container.

What is needed, therefore, and currently not available in the art, is a sensor that can be inserted into a container to provide real-time measurements of not only the differential pressure exerted by the level of a liquid in a container, but also the temperature of a liquid. In addition, once these measurements are obtained, what is needed is a method by which these measurements are used in the accurate real-time calculation of the density (e.g. specific gravity) of the liquid. Further, the sensor must not only be accurate and easy to use but also provide a means for determining whether leakage (loss of actual level) is occurring from within the container. Additionally, what is further needed is a method of transmitting the data obtained from the container sensor to a data management system to determine real-time density based on differential pressure measurements. It is to the provision of such a container sensor system and method that the present invention is primarily directed.

SUMMARY OF THE INVENTION

One aspect of the present invention is to provide a configuration for a container sensor which measures real-time temperature and differential pressure based on two known points in distance.

Another aspect of the present invention relates to a container sensor that can be inserted into the interior of a container to measure at more than one location, the temperature and pressure of the liquid contained therein.

Yet another aspect of the present invention relates to a container sensor that provides not only the height of the liquid in a container, but also the true density (converted to specific gravity) of that liquid based on actual temperature and extrapolated for any temperature.

Yet another aspect of the present invention is to provide a method of using the sensor to determine whether any leakage of the liquid in the container has occurred.

Another aspect of the present invention is to provide a safe and reliable means of measuring the temperature and pressures inside the liquid in a container.

Yet another aspect of the present invention is to provide a method of transmitting the data obtained from the container sensor to a data management system to determine real-time density measurements.

Yet a further aspect of the present invention is to provide a sensor or sensing array that can be easily inserted into the container regardless of the fluid chemistry.

The container sensor invention as disclosed and taught here provides a number of advantages over other container sensors known in the art. For example, having in-situ readings of the temperature and pressure of the liquid inside the container provides greater reliability and accuracy of that data. Since the temperature readings are taken inside the container, the exact liquid pressure (differential pressure between two absolute reference points within the array) and temperature can be determined from the sensors and thus, provide for a more accurate density calculation. In addition, since the container sensor can make several real-time readings of the temperature and pressure at different levels within the liquid, these readings can be used together to determine a more accurate reading. By using the container sensor, one is able to determine whether any leaks exist inside a container, and if so, the flow-rate of those leaks. The container sensor can easily be inserted through a small pipe opening in the container, rather than opening a hatch on top of the container.

These and additional features and advantages of the invention will be set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed. The accompanying drawings are included to provide further understanding of the invention, illustrate various embodiments of the invention, and together with the description serve to explain the principles and operation of the invention.

DETAILED DESCRIPTION OF THE PREFERRED EMBODIMENTS

Figure 1:
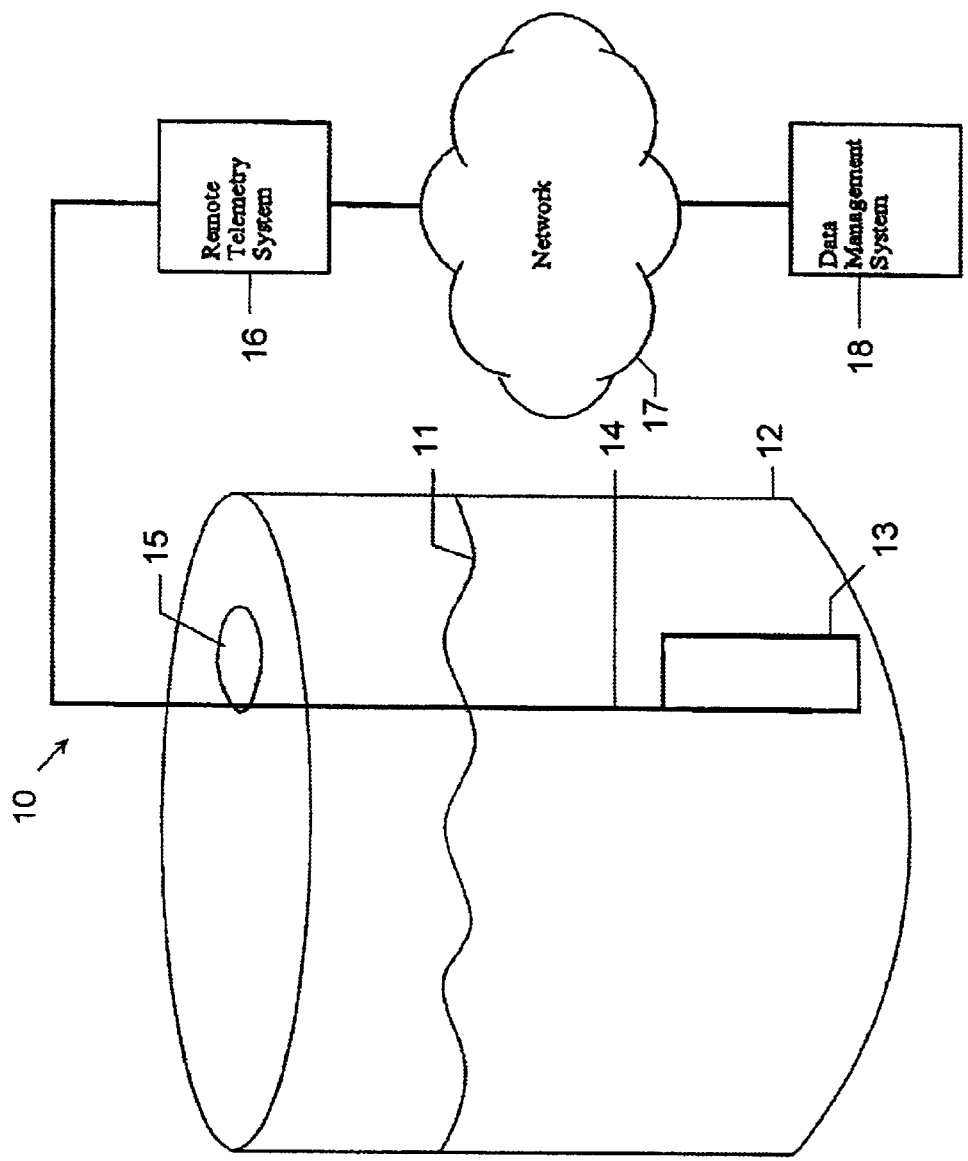
FIG. 1 is a schematic representation of the in-situ sensor system for data acquisition in liquids.

Reference will now be made in detail to the present preferred embodiments of the invention, examples of which are illustrated in the accompanying drawings. Wherever possible, the same reference numerals will be used throughout the drawing figures to refer to the same or like parts.

FIG. 1 illustrates in schematic form a data acquisition system 10 having a remote telemetry system 16, a communications network 17, and a data management system 18 for recording and communicating temperatures and pressures of a liquid 11 inside a container 12 which are then used to calculate the density, height, volume, and leakage of the liquid 11 therein. The sensing mechanism 13 is attached to a cable assembly 14 and is inserted into the liquid 11 held within container 12 through a top access port 15. This top access port 15 may be limited to a two-inch diameter opening. The sensing mechanism 13 is lowered to the bottom of the container 12 and may be retained on the bottom of container 12 magnetically.

The sensing mechanism 13 communicates with data acquisition system 10 and can transmit temperature and pressure measurement signals through the cable assembly 14. The cable assembly 14 comprises instrumentation wires which run the length of the cable assembly 14 to a remote telemetry system 16. Such remote telemetry system 16 is known in the art, and several known manufacturers are Data Logging, Control Microsystems, Telog Instruments, Varatec or Auto Solutions. The pressure and temperature signals are transmitted to remote telemetry system 16. This remote telemetry system 16 obtains and logs the data or signals collected by the sensing mechanism 13. The data or signals from the remote telemetry system 16 can then be transmitted to a communications network 17 and into one or more data management systems 18 which collect, store, and analyze temperature and pressure data. Communication network 17 can be any suitable communications network, including, preferably, the Internet or Worldwide Web.

Figure 2:
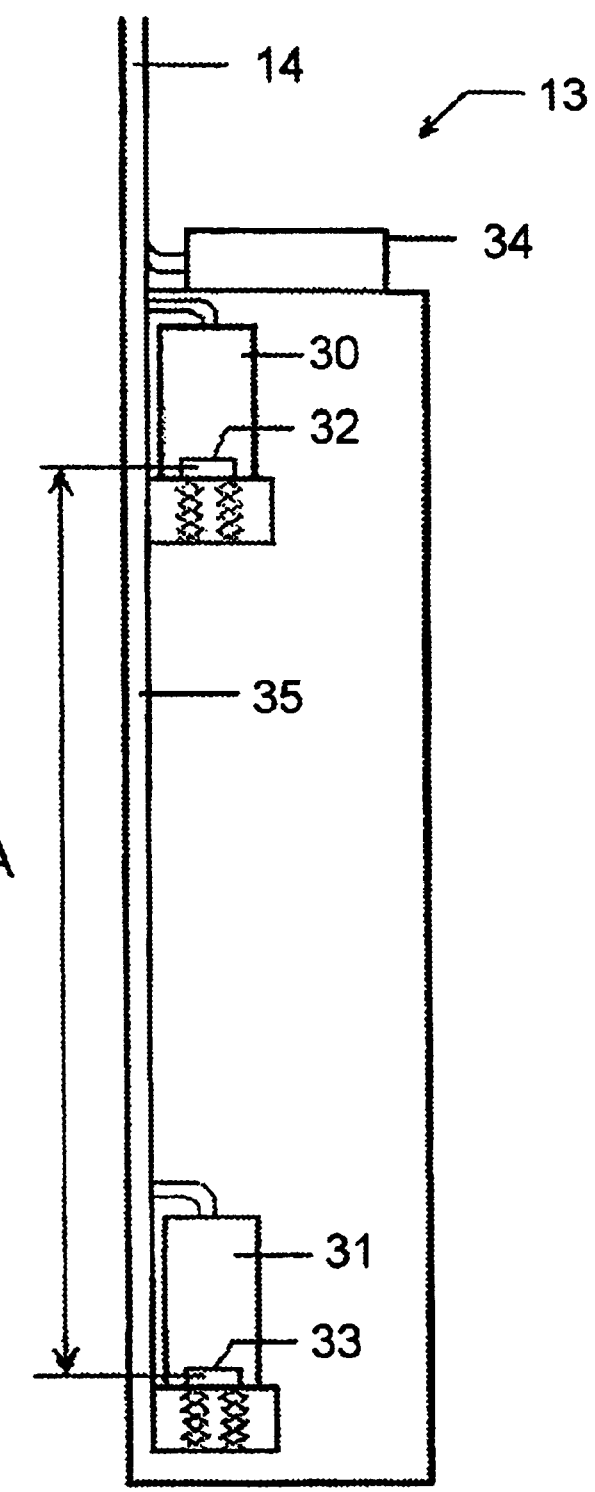
FIG. 2 illustrates the details of the sensing mechanism of the present invention.

FIG. 2 illustrates sensing mechanism or sensor 13 in more detail. Senor 13 has two pressure sensors or pressure interfaces 30 and 31. These pressure sensors or interfaces 30 and 31 can be of any type known in the art but, preferably, are diaphragmatic-based pressure sensors, or pressure sensors that are accurate to 0.01 psi. The diaphragms 32 and 33 are shown in pressure sensors 30 and 31, respectively. Sensor 13 also has a temperature sensor 34 for measuring the temperature of liquid 11. Many temperatures sensors are known in the art and can be used with the present invention, preferably, ones that are accurate to at least 0.1 degree Fahrenheit. Pressure sensors 30 and 31 are attached to a pressure sensor holder 35 which can be made of any suitable material. Pressure sensors 30 and 31 may be placed any distance apart, preferably 36 inches for large tanks, such as, for example, two-million gallon capacity tanks. This distance must be fixed and is depicted in FIG. 2 as distance A between diaphragms 32 and 33. This distance between the pressure sensors must also be accurate to one ten-thousandth of an inch in order for the density estimates to be useful.

A problem that arises with measuring the difference in pressure between two fixed pressure sensors is that the distance between them can vary depending on variations in temperature of the liquid in which they are immersed and on the coefficient of thermal expansion of the pressure sensor holder 35 to which they are fixed. I have discovered that by measuring the temperature of liquid 11 at the same time pressure measurements are made that the distance between the pressure sensors can be known within one ten-thousandth of an inch. This is achieved by using a material for the pressure sensor holder 35 that has a well known coefficient of thermal expansion, for example, stainless steel. If the distance or length between pressure sensors 30 and 31 is accurately and directly measured at a known temperature during the construction process of fixing the pressure sensors to the pressure sensor holder 35, the distance or length between the pressure sensors at any other temperature can be calculated accurately based upon the coefficient of thermal expansion of the material of pressure sensor holder 35. The coefficient of thermal expansion is expressed in units of change in inches per inch of material per degree Fahrenheit. Thus, if the material connecting the two pressure sensors has a coefficient of thermal expansion of 0.000016 and is 36 inches long, a 1 degree Fahrenheit temperature change will increase the length of the material 0.000596 inches. A temperature related change in length of the material holding the pressure sensors can be calculated in the data management system 18 using the coefficient of thermal expansion and can be added to or subtracted from the length of the material at the known temperature to provide an accurate value for the distance between the two pressure sensors.

Density of the liquid 11 in tank 12 is equal to the difference in pressure between the two pressure sensors 30 and 31, divided by the distance A between them. As long as the distance A is known with accuracy and the pressures are measured accurately, the calculation of density will be accurate. The height of the liquid in the tank or container can then be accurately calculated, being equal to the pressure at the bottom of the tank or container divided by the density. Likewise, the volume of the liquid in the tank is equal to the height of the liquid multiplied by the cross-sectional area of the tank. A decrease in volume from one point in time to another, corrected for a change in temperature, would provide the rate at which the tank was leaking.

The data acquisition system 10 can constantly acquire temperature and pressure data in real time through remote telemetry system 16, and it can calculate density, height, volume, and leakage of liquid 11, and continuously display these variables through network 17 and data management system 18. Thus, a user of the present invention could monitor remotely the parameters of a liquid in one or more tanks via the internet, or any other communications network, manage the data as desired, and communicate the data to any other remote location as desired worldwide.

The sensor 13 and cable assembly 14 of the present invention can be easily and safely inserted into or removed from a tank through an opening at the top of the tank. The opening may be as small as two inches in diameter. The container sensor is portable because of its simple construction and small size, and can easily be replaced or removed for repairs or it can be left within the tank indefinitely, as desired.

Under ideal conditions the temperature of liquids in tanks is in equilibrium with the environment, and the temperature is uniform throughout the liquid in the tank. In this situation, sensor 13 can be positioned on the bottom of the tank or container and accurate data can be obtained from this position. However, there are situations where the temperature of the liquid in a tank may not be uniform and the density of the liquid may vary. In this case, the sensor 13 of the present invention may be raised or lowered to any desired position in the tank so that a number of density measurements may be obtained throughout the liquid at various locations and averaged as desired to give more accurate estimates of density, height, volume, and leak rate of the liquid. To accomplish this, sensor 13 may be raised or lowered manually in the liquid of the tank, placed at several locations in order to measure temperature and pressure at several different locations in the liquid. Another way to accomplish this is to provide a plurality of sensors 13 along cable assembly 14 so that each sensor 13 occupies a unique position in the liquid and the combination of the sensors 13 provides temperature and pressure measurements at various levels in the liquid simultaneously. Yet another way to accomplish this is to provide a sensor 13 which is movable on cable assembly 14 so that pressure sensor 13 may be raised or lowered manually or automatically along cable assembly 14 without raising or lowering cable assembly 14.

It will be apparent to those skilled in the art that various modifications and variation can be made to the present invention without departing from the spirit and scope of the invention. Thus, it is intended that the present invention cover the modifications and variations of this invention provided they come within the scope of the appended claims and their equivalents.

I claim:

1. A sensor for measuring density in a liquid, comprising:
   a) two pressure sensors or pressure interfaces separated by a fixed and known distance and located within a container of said liquid;
   b) material to which said pressure sensors or pressure interfaces are fixed, said material having a known coefficient of thermal expansion; and
   c) a temperature sensor to provide a temperature measurement for correction of the distance between said two pressure sensors based on said coefficient of thermal expansion.

2. The sensor of claim 1 wherein said fixed distance is 36 inches.

3. The sensor of claim 2 wherein said pressure sensors are accurate to at least 0.01 psi.

4. The sensor of claim 3 wherein said temperature sensor is accurate to at least 0.1 degree Fahrenheit.

5. The sensor of claim 1 wherein said sensor communicates with a data acquisition system.

6. The sensor of claim 5 wherein said sensor is connected to a cable assembly system.

7. The sensor of claim 6 wherein said cable assembly has a plurality of said sensors.

8. The sensor of claim 6 wherein said sensor is movable along said cable assembly.

9. The sensor of claim 6 wherein said data acquisition system comprises a remote telemetry system, a communication network, and one or more data management systems.

10. The sensor of claim 9 wherein said communication network is the Internet.

11. The sensor of claim 5 wherein said sensor is portable and can fit through an opening as small as two inches in diameter.

12. A sensor system for data acquisition in a liquid, comprising:
   a) two pressure sensors separated by a fixed distance within a container of said liquid;
   b) material to which said pressure sensors are fixed, said material having a known coefficient of thermal expansion;
   c) a temperature sensor to provide a temperature measurement for correction of the distance between said two pressure sensors based on said coefficient of thermal expansion; and
   d) a data acquisition system for acquiring data from said pressure sensors and from said temperature sensor.

13. The sensor system of claim 12 wherein said data acquisition system comprises a remote telemetry system, a communication network, and one or more data management systems for providing temperature and pressure data for distribution and management, and for providing density, height, volume, and leak rate information for said liquid in said container.

14. The sensor system of claim 13 wherein said communication network is the Internet.

15. The sensor system of claim 14 wherein said correction of the distance between said two pressure sensors is performed within said data management system.

16. A sensor method for measuring density in a liquid, comprising the steps of:
   a) determining the length at a known temperature between two pressure sensors fixed to a material with a known coefficient of thermal expansion;
   b) placing said pressure sensors in a container of said liquid;
   c) measuring the difference in pressure between said two pressure sensors by measuring the pressure at the level of the two pressure sensors in the liquid;
   d) measuring the temperature of the liquid at the location of each pressure sensor with a temperature sensor;
   e) correcting for a change in said length of said material to which said pressure sensors are fixed using the measured temperature of the liquid and the known coefficient of thermal expansion of the material to provide a corrected length between the two pressure sensors; and
   f) calculating the density of said liquid using a difference in pressure between said two pressure sensors and said corrected length between said two pressure sensors.

17. The sensor method of claim 16 further comprising the step of transmitting measurements of temperature and pressure to a data acquisition system.

18. The sensor method of claim 17 wherein said data acquisition system has a remote telemetry system.

19. The sensor method of claim 18 wherein said data acquisition system has a communications network.

20. The sensor method of claim 19 wherein said data acquisition system has one or more data management systems.

21. The sensor method of claim 20 wherein said communications network is the Internet.

22. The sensor method of claim 16 wherein one of said two pressure sensors is placed at the bottom of said container of said liquid.

23. The sensor method of claim 22 wherein the height, volume, and leak rate of said liquid are calculated from the density of the liquid and the pressure at the bottom of the container of said liquid.

24. The sensor method of claim 23 wherein said length between the two pressure sensors at a known temperature is 36 inches.

25. The sensor method of claim 21 wherein said corrected length is accurate to a level of at least 0.0001 inches.

26. The sensor method of claim 16 wherein a plurality of two pressure sensors are placed at a plurality of locations within said liquid.

* * * * *